(12) United States Patent
Takei et al.

(10) Patent No.: US 8,070,466 B2
(45) Date of Patent: Dec. 6, 2011

(54) SEAMLESS CAPSULE MANUFACTURING APPARATUS

(75) Inventors: Narimichi Takei, Shinjuku-ku (JP); Hiroshi Nagao, Shinjuku-ku (JP)

(73) Assignee: Freund Corporation, Tokyo (JP)

( * ) Notice: Subject to any disclaimer, the term of this patent is extended or adjusted under 35 U.S.C. 154(b) by 67 days.

(21) Appl. No.: 12/311,491

(22) PCT Filed: Sep. 25, 2007

(86) PCT No.: PCT/JP2007/068500
§ 371 (c)(1),
(2), (4) Date: Apr. 1, 2009

(87) PCT Pub. No.: WO2008/044459
PCT Pub. Date: Apr. 17, 2008

(65) Prior Publication Data
US 2010/0040717 A1    Feb. 18, 2010

(30) Foreign Application Priority Data

Oct. 11, 2006  (JP) ................................. 2006-278031

(51) Int. Cl.
*B01J 13/02*  (2006.01)
(52) U.S. Cl. ........... 425/5; 425/3; 425/6; 425/7; 425/10; 264/4; 264/4.1; 264/4.3; 264/5; 264/9
(58) Field of Classification Search .................. 425/3, 5, 425/6, 7, 10; 264/4, 4.1, 4.3, 4.32, 4.33, 264/4.4, 4.6, 4.7, 5, 6, 9, 12, 13
See application file for complete search history.

(56) References Cited

U.S. PATENT DOCUMENTS

| | | | | |
|---|---|---|---|---|
| 2,911,672 A | * | 11/1959 | Van Erven Dorens et al. ... | 264/4 |
| 3,729,278 A | * | 4/1973 | Lysher ............................ | 425/10 |
| 4,003,683 A | * | 1/1977 | Powell et al. .................... | 425/6 |
| 4,061,164 A | * | 12/1977 | Sato et al. ....................... | 141/90 |
| 4,162,282 A | * | 7/1979 | Fulwyler et al. ................. | 264/9 |

(Continued)

FOREIGN PATENT DOCUMENTS

JP        59-112831        6/1984
(Continued)

OTHER PUBLICATIONS

Concise explanation of Japanese reference 04-67985 (previously submitted as reference BD in the information Disclosure Statement filed Apr. 1, 2009).

(Continued)

*Primary Examiner* — Joseph Del Sole
*Assistant Examiner* — Seyed Masoud Malekzadeh
(74) *Attorney, Agent, or Firm* — Wenderoth, Lind & Ponack, L.L.P.

(57) ABSTRACT

In a seamless capsule manufacturing apparatus that ejects a droplet from a nozzle into hardening liquid to manufacture a seamless capsule SC, tube passages which are synthetic resin tubes are provided as flexible sections between pumps and the nozzle. The vibration caused by the pumps is absorbed in the flexible sections and thus is not transmitted to the nozzle, whereby eyes or the like of the seamless capsule caused by vibration noises can be suppressed. Instead of a synthetic resin tube, a vibration absorbing block formed of an elastic member may be attached to the tube passages. Alternatively, a vibration absorbing unit, which is provided with a pad formed of an elastic member and for holding the tube passages, may be provided.

14 Claims, 6 Drawing Sheets

U.S. PATENT DOCUMENTS

| | | | | |
|---|---|---|---|---|
| 4,220,441 | A * | 9/1980 | Tomita et al. | 425/6 |
| 4,238,173 | A * | 12/1980 | Anderson | 425/6 |
| 4,251,195 | A * | 2/1981 | Suzuki et al. | 425/6 |
| 4,279,632 | A * | 7/1981 | Frosch et al. | 65/21.4 |
| 4,302,166 | A * | 11/1981 | Fulwyler et al. | 425/6 |
| 4,344,787 | A * | 8/1982 | Beggs et al. | 65/21.4 |
| 4,426,337 | A * | 1/1984 | Suzuki et al. | 264/4 |
| 4,428,894 | A * | 1/1984 | Bienvenu | 75/335 |
| 4,692,284 | A * | 9/1987 | Braden | 264/4.3 |
| 4,814,574 | A * | 3/1989 | Babel et al. | 219/69.12 |
| 4,902,450 | A * | 2/1990 | Morrison | 264/4 |
| 4,960,351 | A * | 10/1990 | Kendall et al. | 425/6 |
| 4,960,547 | A * | 10/1990 | Reinhard | 264/11 |
| 4,981,625 | A * | 1/1991 | Rhim et al. | 264/13 |
| 5,223,185 | A * | 6/1993 | Takei et al. | 264/4 |
| 5,387,093 | A * | 2/1995 | Takei | 425/5 |
| 5,474,235 | A * | 12/1995 | Cole et al. | 239/431 |
| 5,478,508 | A * | 12/1995 | Suzuki et al. | 264/4 |
| 6,183,670 | B1 * | 2/2001 | Torobin et al. | 264/6 |
| 6,318,123 | B1 * | 11/2001 | Edlinger | 65/19 |
| 6,377,387 | B1 * | 4/2002 | Duthaler et al. | 359/296 |
| 6,432,330 | B1 * | 8/2002 | Hanabe et al. | 264/9 |
| 6,458,296 | B1 * | 10/2002 | Heinzen et al. | 264/9 |
| 6,676,890 | B2 * | 1/2004 | Chaleat et al. | 266/236 |
| 7,153,114 | B2 * | 12/2006 | Snyder et al. | 425/8 |
| 7,306,752 | B2 * | 12/2007 | Nakatani | 264/9 |
| 7,413,690 | B1 * | 8/2008 | Cheboyina et al. | 264/13 |
| 7,776,503 | B2 * | 8/2010 | Makino et al. | 430/137.1 |
| 2003/0013783 | A1 * | 1/2003 | Kommareddi et al. | 523/175 |
| 2003/0116641 | A1 * | 6/2003 | Ohnishi et al. | 239/102.1 |
| 2004/0026804 | A1 * | 2/2004 | Gupta et al. | 264/7 |
| 2005/0263250 | A1 * | 12/2005 | Ono | 156/349 |

FOREIGN PATENT DOCUMENTS

| | | | |
|---|---|---|---|
| JP | 59-112833 | | 6/1984 |
| JP | 60-124626 | * | 7/1985 |
| JP | 6-40953 | | 8/1987 |
| JP | 4-67985 | | 10/1992 |
| JP | 3361131 | | 10/2002 |

OTHER PUBLICATIONS

International Preliminary Report on Patentability issued Apr. 30, 2009 in the corresponding International application.

International Search Report issued Nov. 6, 2007 in the International (PCT) Application of which the present application is the U.S. National Stage.

* cited by examiner

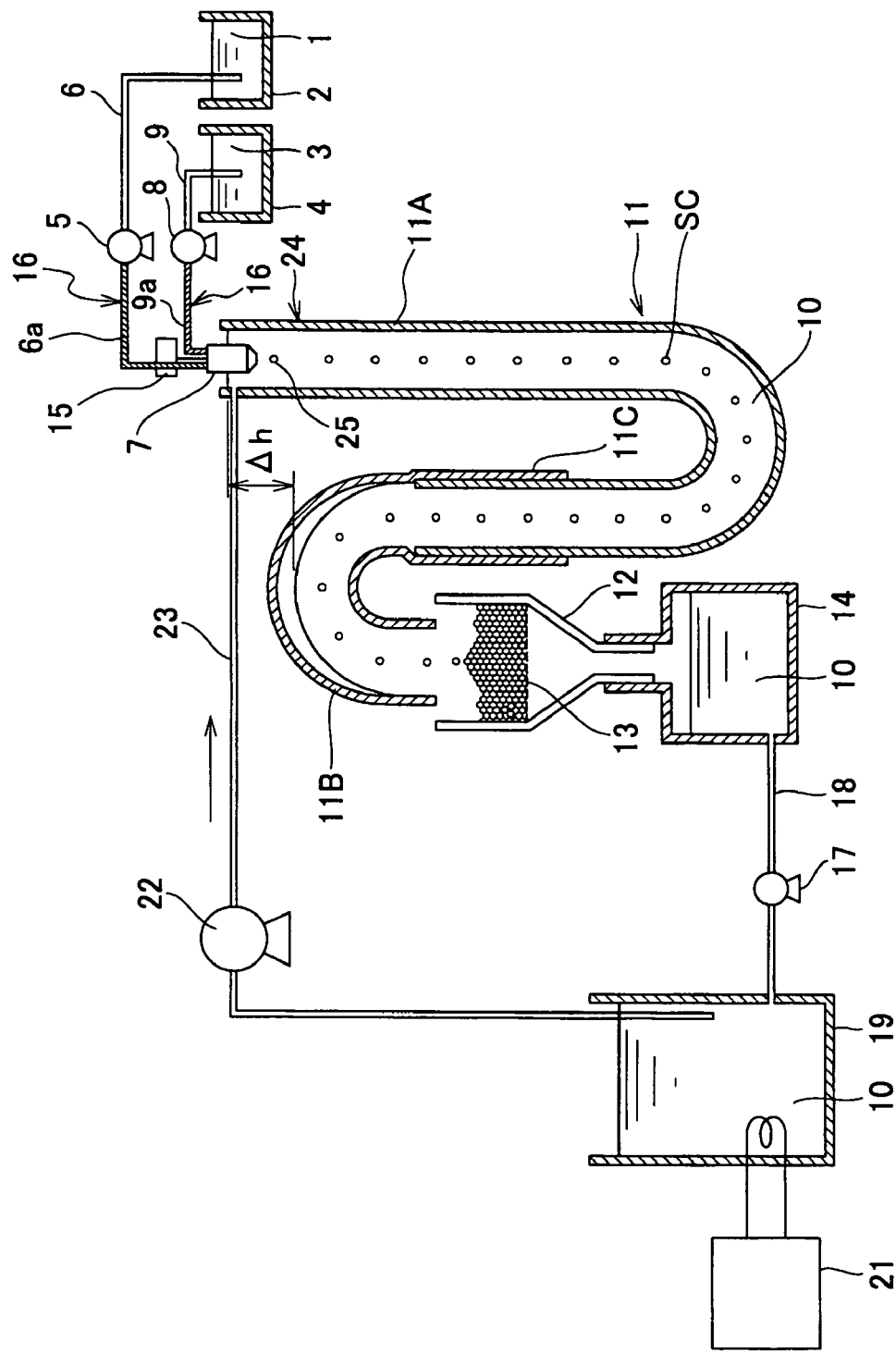
[FIG. 1]

[FIG. 2]
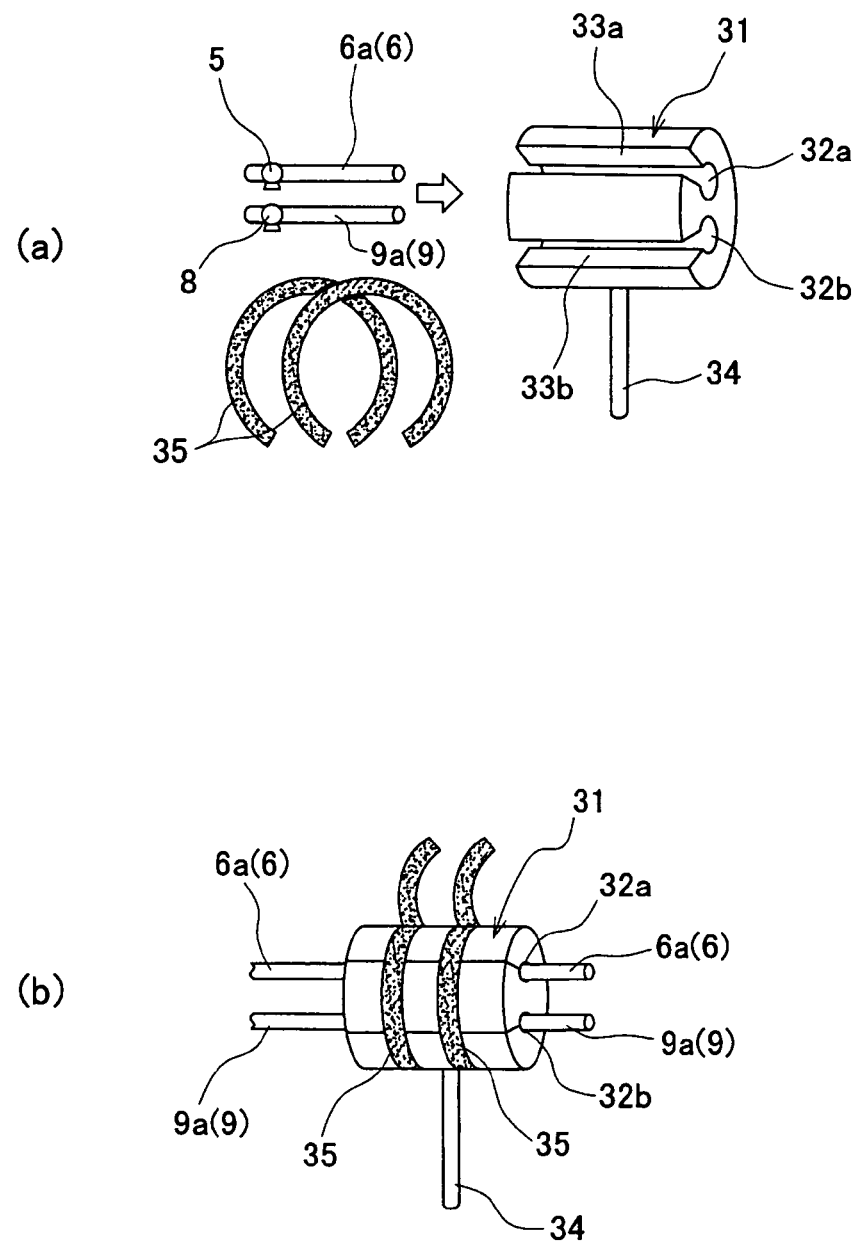

[FIG. 3]
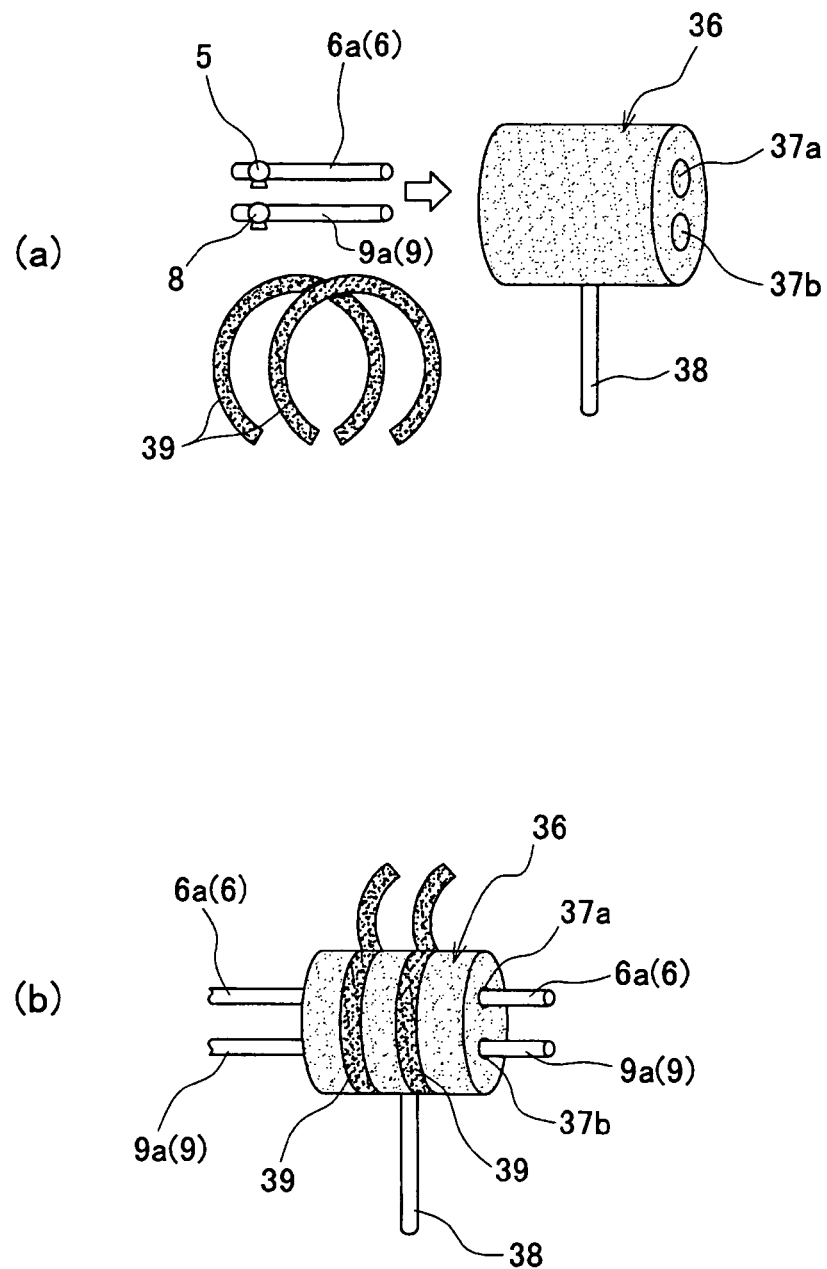

[FIG. 4]
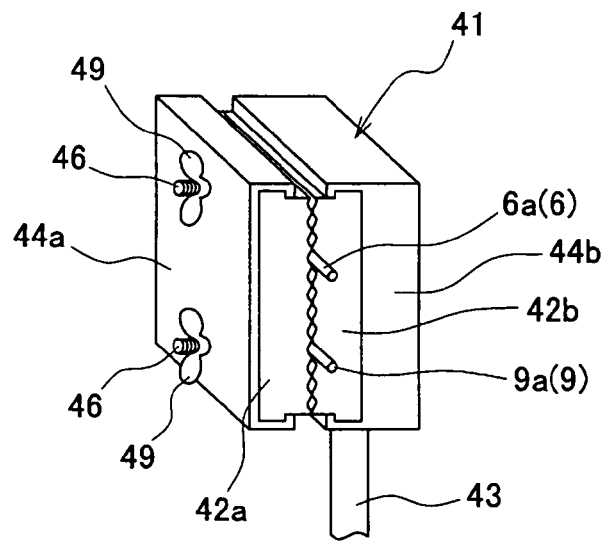
[FIG. 5]
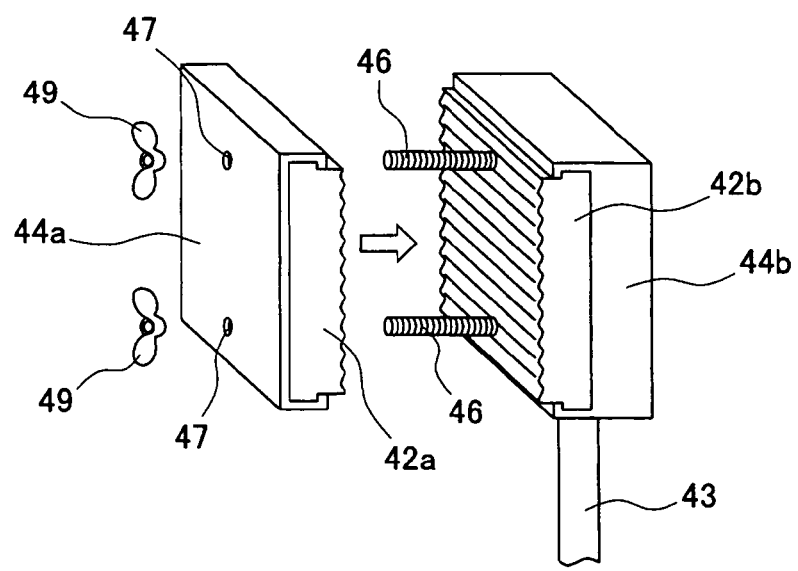

[FIG. 6]
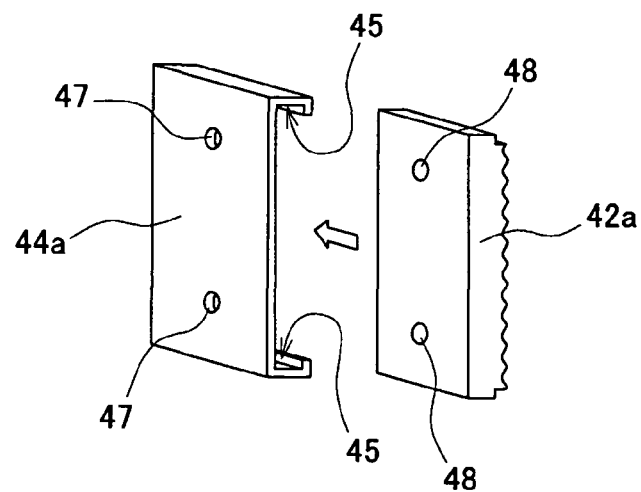
[FIG. 7]
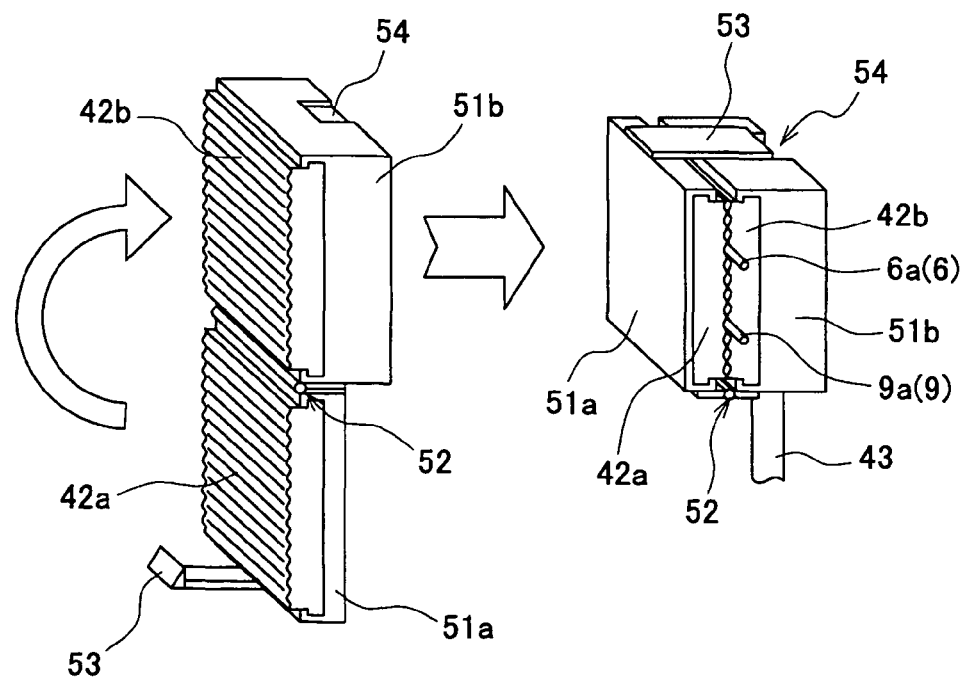

[FIG. 8]
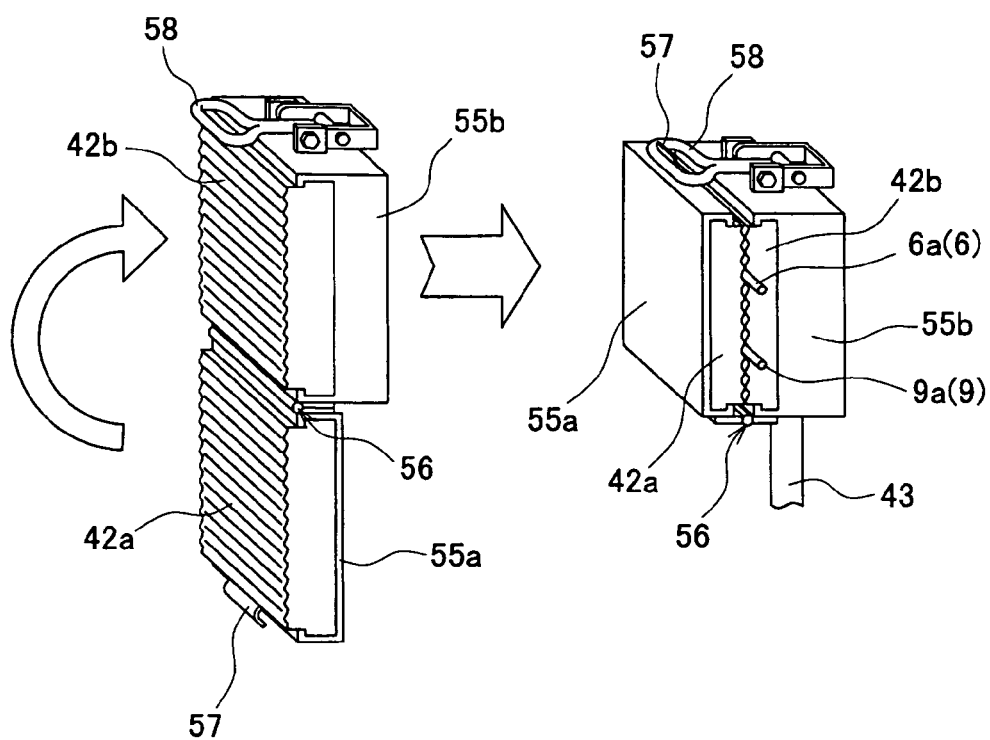

SEAMLESS CAPSULE MANUFACTURING APPARATUS

TECHNICAL FIELD

The present invention relates to a manufacturing technique of a seamless capsule that encapsulates a filler material such as a food product, a health food product, a medicine, a flavor, or a spice, with a capsule shell material such as gelatin or vegetable gelatin.

BACKGROUND ART

Conventionally, many seamless capsules used for a medicine or the like are manufactured by a so-called dropping method. The dropping method is carried out by using a multiple nozzle. Thus, in the case of manufacturing a two-layer capsule, a double nozzle having an ejection port for ejecting the capsule filling substance and an ejection port for ejecting the film forming substance respectively arranged at the inside and at the outside is used. The filling substance and the film forming substance are ejected from the tips of the respective nozzles into hardening liquid, and the ejected liquid drops take a spherical form due to the surface tension thereof. Then, the liquid drops are cooled and hardened in the hardening liquid that is forced to circulate at a constant speed to make spherical seamless capsules.

As such a seamless capsule manufacturing apparatus, those disclosed in, e.g., Patent Documents 1 to 3 have been proposed. Patent Document 1 discloses a seamless capsule manufacturing apparatus using a multiple nozzle provided with a vibration unit. In the apparatus of Patent Document 1, liquid flow for forming capsule is allowed to be ejected from the multiple nozzles into hardening liquid. Jet liquid flow formed in the hardening liquid is cut by means of vibration to thereby form a multilayer seamless capsule. More specifically, a vibration unit is arranged at a diaphragm-shaped flexible part provided at the upper portion of the nozzle. Vibration is applied to the nozzle using the vibration unit to divide the jet liquid flow in the hardening liquid into multilayer droplets. The multilayer droplet is moved in the hardening liquid together with the liquid flow. Then, the external layer of each droplets are hardened to form a multilayer seamless capsule.

Patent Document 2 discloses a seamless capsule manufacturing apparatus that applies intermittent flow of coolant in a regular manner to jet flow of capsule forming liquid which is ejected from a multiple nozzle from the side periphery of the jet flow to thereby form a multilayer seamless capsule. In the apparatus of Patent Document 2, the capsule forming liquid is supplied from a liquid storage tank to the nozzle by means of a liquid feed pump and is ejected from the nozzle as jet flow. The jet flow is divided by means of impact of the intermittent flow of the coolant into small multilayer droplets, each of which is hardened in the coolant to become a multilayer seamless capsule. Patent Document 3 discloses a seamless capsule manufacturing apparatus that directly vibrates the nozzle so as to form a multilayer seamless capsule. In the apparatus of Patent Document 3, the flexible part as provided in the apparatus of Patent Document 1 is not provided in the nozzle, but a vibration unit provided at the upper portion of the nozzle is used to directly apply vibration to the nozzle.
Patent Document 1: Japanese Patent No. 3361131
Patent Document 2: Jpn. Pat. Appln. Publication No. 04-067985
Patent Document 3: Jpn. Pat. Appln. Laid-Open Publication No. 59-112831

Meanwhile, in such a seamless capsule manufacturing apparatus, capsule forming liquid is generally supplied from a liquid storage tank to the nozzle by a liquid feeding unit provided with a liquid feeding pump. The liquid storage tank and nozzle are connected to each other by a liquid feeding tube. That is, the capsule forming liquid is supplied to the nozzle through the liquid feeding tube by the operation of the liquid feeding pump. However, in such a seamless capsule manufacturing apparatus, when the liquid feeding pump is activated, vibration occurs in the liquid feeding unit. This vibration is transmitted to the liquid feeding tube to thereby vibrate the tube itself. When the liquid supply tube vibrates the vibration is transmitted to the nozzle, with the result that the vibration is superposed on (added to) the jet flow ejected from the nozzle.

When vibration is applied to the nozzle as in the case of the apparatus disclosed in Patent Documents 1 and 3 in a state where the vibration is superposed on the jet flow, it causes a problem in that vibration other than the vibration applied by the vibration unit is added to the jet flow as noise. When a noise component other than the vibration unit is added to the vibration added to the jet flow, a nonuniform liquid layer may be caused or droplet diameter may become nonuniform, causing problems, such as casing eyes of the seamless capsule, uneven thickness thereof, or variation in the particle diameter thereof.

In contrast, in the apparatus disclosed in Patent Document 2, an accumulator for alleviating minute pulsating flow of the liquid to be supplied is provided between the pump and nozzle so as to keep the nozzle inner pressure substantially constant. However, this configuration does not prevent the vibration generated in the pump from being transmitted to the nozzle. Thus, a problem of the noise vibration cannot be solved.

On the other hand, in the apparatus disclosed in Patent Document 3, a flexible portion for absorbing the vibration of the nozzle is provided in the middle of the liquid feeding tube so as to prevent the vibration of the nozzle from being transmitted to the pump side. This configuration eventually allows the vibration generated in the pump to be absorbed at this flexible portion. However, the flexible portion disclosed in Patent Document 3 aims to prevent an adverse effect caused due to application of the vibration to the nozzle itself and is an adapter-type member attached to the connection portion between the liquid feeding tube and nozzle. An experiment conducted by the present inventor reveals that it is impossible to sufficiently prevent transmission of the vibration generated on the liquid feeding unit side only by attaching the adapter-type small member to the pipe sleeve. In addition, the influence that the vibration generated on the liquid feeding unit side gives to the nozzle is far greater than the influence that the vibration generated on the nozzle gives to the pump and is directly linked to product quality.

An object of the present invention is to prevent the vibration generated on the liquid feeding unit side from being transmitted to the nozzle in the seamless capsule manufacturing apparatus so as to reduce vibration noise at the time of capsule formation thereby stabilizing product quality.

SUMMARY OF THE INVENTION

According to the present invention, there is provided a seamless capsule manufacturing apparatus that ejects a droplet from a nozzle into hardening liquid to harden at least the surface area of the droplet to thereby manufacture a seamless capsule. The apparatus includes a liquid tank that stores liquid for forming capsule; a tube passage that connects the liquid tank and nozzle; a liquid feeding unit that is connected to the tube passage and feeds the liquid in the liquid tank to the nozzle; a vibration applying means for applying vibration to the nozzle; and a vibration absorbing means arranged between the liquid feeding unit and nozzle and for absorbing the vibration generated by the liquid feeding unit in the tube passage.

In the present invention, by arranging the vibration absorbing means for absorbing vibration generated by the liquid feeding unit in the tube passage between the liquid feeding unit and nozzle, it is possible to prevent the vibration from being transmitted to the nozzle. Thus, vibration from any source other than the vibration unit is not applied to the nozzle, i.e., vibration noise is not applied to the nozzle at the time of formation of droplets, thereby suppressing occurrence of eyes of the seamless capsule, uneven thickness thereof, or variation in the particle diameter thereof.

In the seamless capsule manufacturing apparatus, the vibration absorbing means may be the tube passage at least 50% or more of which is formed of a flexible member. In this case, the tube passage may be a synthetic resin tube.

The vibration absorbing means may be a vibration absorbing block which is formed of an elastic member and is attached to the tube passage. In this case, the vibration absorbing block may have a tube passage attachment hole through which the tube passage is inserted. Further, the vibration absorbing block may be fastened by a fastening member from the outer periphery thereof in a state in which the tube passage is inserted through the vibration absorbing block.

Further, the vibration absorbing means may be a vibration absorbing unit which has pad members formed of an elastic member and for holding the tube passage therebetween. In this case, the pad members may be retained by holder members respectively and arranged so as to face each other, and the tube passage may be held between the pad members.

ADVANTAGES OF THE INVENTION

Thus, in the seamless capsule manufacturing apparatus of the present invention that ejects a droplet from a nozzle into hardening liquid to harden at least the surface area of the droplet to thereby manufacture a seamless capsule, since the vibration absorbing means for absorbing vibration generated by the liquid feeding unit in the tube passage is arranged between the liquid feeding unit and nozzle, it is possible to prevent the vibration of the liquid feeding unit from being transmitted to the nozzle. Thus, vibration noise at the time of formation of droplets can be reduced, thereby suppressing occurrence of eyes of the seamless capsule, uneven thickness thereof, or variation in the particle diameter thereof. As a result, product quality can be enhanced and thereby seamless capsules of satisfactory quality can be manufactured stably.

BRIEF DESCRIPTION OF THE DRAWINGS

FIG. 1 is an explanatory view showing a configuration of a seamless capsule manufacturing apparatus according to a first embodiment of the present invention;

FIG. 2 is an explanatory view showing a configuration of a vibration absorbing block 31 used in a seamless capsule manufacturing apparatus according to a second embodiment in which FIG. 2 (a) shows a state before attachment and FIG. 2 (b) shows a state after attachment;

FIG. 3 is an explanatory view showing a configuration of a vibration absorbing block (vibration absorbing means) 36 used in a seamless capsule manufacturing apparatus according to a third embodiment of the present invention in which FIG. 3 (a) shows a state before attachment and FIG. 3 (b) shows a state after attachment;

FIG. 4 is a perspective view showing a configuration of a vibration absorbing unit used in a seamless capsule manufacturing apparatus according to a fourth embodiment of the present invention;

FIG. 5 is an exploded perspective view of the vibration absorbing unit of FIG. 4;

FIG. 6 is an exploded perspective view of a pad holder;

FIG. 7 is an explanatory view showing a modification of the fixing structure of the pad holder; and FIG. 8 is an explanatory view showing a modification of the fixing structure of the pad holder.

EXPLANATION OF REFERENCE SYMBOLS

1: Core liquid
2: Core liquid tank
3: Film forming liquid
4: Film forming liquid tank
5: Pump
6: Tube passage
6a: Part of tube passage between pump and nozzle
7: Multiple nozzle
8: Pump
9: Tube passage
9a: Part of tube passage between pump and nozzle
10: Hardening liquid
11: Flow passage tube
11A: Inflow section
11B: Outflow section
11C: Engaging section
12: Separator
13: Mesh
14: Separation tank
15: Vibration unit
16: Flexible section
17: Pump
18: Tube passage
19: Cooling tank
21: Cooler
22: Pump
23: Tube passage
24: Inlet part
25: Droplet
31: Vibration absorbing block
32a, 32b: Tube passage attachment hole
33a, 33b: Slit
34: Block installation bar
35: Cable tie
36: Vibration absorbing block
37a, 37b: Tube passage attachment hole
38: Block installation bar
39: Cable tie
41: Vibration absorbing unit
42a, 42b: Pad
43: Block installation bar
44: Pad holder
44a, 44b: Pad holder
45: Holder fitting groove
46: Fixing bolt
47: Bolt hole
48: Bolt hole
49: Wing nut
51a, 51b: Pad holder
52: Hinge
53: Engagement pawl 54: Engagement groove
55a, 55b: Pad holder
56: Hinge
57: Engagement piece
58: Fixing hand
SC: Seamless capsule

DETAILED DESCRIPTION OF THE INVENTION

Embodiments of the present invention will be described in detail below with reference to the accompanying drawings.

First Embodiment

FIG. 1 is an explanatory view showing a configuration of a seamless capsule manufacturing apparatus according to a first embodiment of the present invention. The seamless capsule manufacturing apparatus shown in FIG. 1 is adapted to manufacture seamless capsules SC by ejecting droplets from a multiple nozzle 7 (hereinafter, abbreviated as "nozzle 7") into a flow passage tube 11. Core liquid (inner layer liquid) 1 for forming seamless capsules SC is stored in a core liquid tank (liquid tank) 2. Film forming liquid (outer layer liquid) 3 for coating each drop of core liquid 1 is stored in a film forming liquid tank (liquid tank) 4. Core liquid 1 is fed by a pump (liquid feeding unit) 5 to the nozzle 7 under pressure from the core liquid tank 2 by way of a tube passage 6. Film forming liquid 3 is fed to the nozzle 7 under pressure from the film forming liquid tank 4 by way of a tube passage 9 by means of a pump (liquid feeding unit) 8. A heater formed by a nickel-chrome alloy wire is wounded around the tube passage 9 so as to heat the film forming liquid 3 flowing in the tube passage 9.

The flow passage tube 11 has, at an upper inlet part thereof, an inflow section 11A of hardening liquid 10. Hardening liquid 10 is supplied to the inflow section 11A from the pump 22 by way of tube passage 23. The seamless capsule manufacturing apparatus is of a so-called intra-liquid nozzle type and the nozzle 7 is put into and placed in an inlet part 24 of the inflow section 11A. The core liquid 1 and film forming liquid 3 are ejected as capsule forming liquid from the nozzle 7. Vibration is applied to the nozzle 7 by a vibration unit (vibration means) 15. The liquid ejected from the nozzle 7 is appropriately separated by the vibration to form a multilayer droplet 25 (hereinafter, abbreviated as "droplet 25") where a drop of core liquid 1 is coated by film forming liquid 3 all around its surface. The droplets 25 are cooled and hardened as they are moved through hardening liquid 10 to produce seamless capsules SC.

The flow passage tube 11 is formed as a curved cylinder having a substantially J-shaped inflow section 11A and an inverted J-shaped outflow section 11B that is telescopically linked to the inflow section 11A. The inflow section 11A and the outflow section 11B are engaged with and rigidly secured to each other at an engaging section 11C to provide a hermetically sealed condition. Alternatively, the inflow section 11A and the outflow section 11B may be linked to each other at the engaging section 11C so as to be vertically movable relative to each other. With such a configuration, the difference Δh of the liquid level of the inflow section 11A and that of the outflow section 11B can be made variable and then it is possible to adjust the flow rate of the hardening liquid 10 in the flow passage tube 11.

A cylindrical inlet part 24 that is exposed to the nozzle 7 is arranged at the top end of the inflow section 11A. A substantially funnel-shaped separator 12 is arranged below the outlet end of the outflow section 11B. A mesh 13 is arranged in the separator 12 so as not to allow seamless capsules SC to pass but allow only hardening liquid 10 to pass through it. Thus, the seamless capsules SC and the hardening liquid 10 that flow out from the flow passage tube 11 together are separated by the separator 12 from each other. The hardening liquid 10 separated from the seamless capsules SC by the separator 12 is collected in a separation tank 14 arranged below. The hardening liquid 10 in the separation tank 14 is fed to a cooling tank 19 under pressure by way of a tube passage 18 by means of a pump 17. Then, the hardening liquid 10 is cooled in the cooling tank 19 to a predetermined temperature level by means of a cooler 21. The hardening liquid 10 in the cooling tank 19 is then returned to the flow passage tube 11 by means of a pump 22.

Meanwhile, in the seamless capsule manufacturing apparatus, a part of the tube passage 6 and a part of the tube passage 9 (parts 6a and 9a positioned on the nozzle 7 side relative to the pumps 5 and 8: denoted by shading in FIG. 1) are formed of a fluorine-based synthetic resin (flexible member) to serve as flexible sections 16. For each of the flexible sections 16, a tube having an inner diameter of 4 mm formed by, e.g., Teflon® of DuPont is used. Many core liquids 1 contain oil and, therefore, the tube passage 6 in which the core liquid 1 flows requires oil resistance. On the other hand, gelatin liquid is often used as the film forming liquid 3. Such film forming liquid 3 is fed in a heated condition (about 80° C.) and, therefore, the tube passage 9 in which the film forming liquid 3 flows requires heat resistance. Thus, a member having both oil resistance and heat resistance is preferably used for the tube passages 6 and 9. In view of this, as a member having flexibility and satisfying the above requirements, a tube formed of a fluorine-based synthetic resin is used.

The seamless capsule manufacturing apparatus having the above-described configuration manufactures seamless capsules in a manner as described below. Firstly, the core liquid 1 and film forming liquid 3 are ejected from the nozzle 7 to form spherical droplets 25 in the hardening liquid 10 in the flow passage tube 11. The droplets 25 are then cooled in the flow passage tube 11 to become seamless capsules SC. Thereafter, the seamless capsules SC flow down with hardening liquid 10 from the outlet end of the outflow section 11B onto the mesh 13 of the separator 12. Then, the seamless capsules SC are separated from hardening liquid 10 by the mesh 13 and, when they gets to an appropriate amount, collected in a product collecting container (not shown) in a batch-wise manner. On the other hand, the hardening liquid 10 passes through the mesh 13 and is collected in the separation tank 14.

Meanwhile, when the pump 5 or 8 is activated during the manufacturing process of the seamless capsules, there may be a case where vibration generated by the pump is transmitted to the nozzle 7 as vibration noise through the tube passage 6 or 9 to adversely affect the quality of the seamless capsules. In contrast to this, in the seamless capsule manufacturing apparatus according to the present invention, the tube passages 6 and 9 have the flexible sections 16 between the pump and nozzle, and the flexible sections 16 act as a vibration absorbing means to thereby absorb the vibration generated by the pumps 5 and 8. Thus, the vibration generated by the pumps 5 and 8 is not transmitted to the nozzle 7. As a result, at the time of formation of the droplets 25, vibration is not applied to the nozzle 7 from any source other than the vibration unit 15.

That is, transmission of the vibration noise from the pumps 5 and 8 is blocked by the flexible sections 16, and the liquid ejected from the nozzle 7 is cut only by the vibration generated by the vibration unit 15. Therefore, it is possible to suppress occurrence of eyes of the seamless capsule SC, uneven thickness thereof, or variation in the particle diameter thereof due to vibration noise. As a result, product quality can be enhanced and thereby seamless capsules of satisfactory quality can be manufactured stably.

Second Embodiment

Next, a seamless capsule manufacturing apparatus according to a second embodiment will be described. In the second embodiment, a vibration absorbing block which is an elastic member is used as a vibration absorbing means. This vibration absorbing block is attached to the outer periphery of the tube passages 6 and 9 to block transmission of the vibration noise. FIG. 2 is an explanatory view showing a configuration of a vibration absorbing block 31 used in the seamless capsule manufacturing apparatus according to the second embodiment. FIG. 2 (*a*) shows a state before attachment, and FIG. 2 (*b*) shows a state after attachment. Except for the above, the present embodiment is the same as the first embodiment. Therefore, detailed descriptions of the present embodiment are omitted. Further, the same reference numerals as those in the first embodiment denote the same members or parts as those in the first embodiment, and the descriptions thereof are omitted here.

As shown in FIG. 2, the vibration absorbing block 31 has a substantially columnar shape as a whole and is an elastic member made of synthetic resin, such as rubber, urethane, or sponge. The vibration absorbing block 31 is attached to the nozzle 7 side portions of the tube passages 6 and 9 relative to the pumps 5 and 8. Two tube passage attachment holes 32*a* and 32*b* are formed in the center portion of the vibration absorbing block 31 so as to extend along the axial direction thereof. The tube passage attachment holes 32*a* and 32*b* have slits 33*a* and 33*b* respectively along the axial direction thereof. As shown in FIG. 2 (*a*), the tube passages 6 and 9 are inserted through the tube passage attachment holes 32*a* and 32*b*, respectively.

A block installation bar 34 is fixed to the substantially axial direction center portion of the vibration absorbing block 31. By means of the bar 34, vibration absorbing block 31 is installed at a stable location, such as the apparatus main body, where the vibration absorbing block 31 is not affected by any other vibration. That is, in the seamless capsule manufacturing apparatus according to the present embodiment, the vibration absorbing block 31 is not floating in midair. After insertion of the tube passages 6 and 9 through the tube passage attachment holes 32*a* and 32*b*, the vibration absorbing block 31 is fastened by a cable tie (fastening member) 35 as shown in FIG. 2 (*b*). The cable tie 35 is wound around the outer periphery of the vibration absorbing block 31 to fasten the vibration absorbing block 31 from the outer periphery thereof. As a result, the slits 33*a* and 33*b* are closed and thereby the vibration absorbing block 31 is secured to the outer periphery of the tube passages 6 and 9.

In such a seamless capsule manufacturing apparatus, the vibration absorbing block 31 is attached to the tube passages 6 and 9 at the portions between the pump and nozzle, so that the vibration generated by the pumps 5 and 8 is absorbed by the vibration absorbing block 31. Thus, the vibration generated by the pumps 5 and 8 is not transmitted to the nozzle 7, making it possible to suppress occurrence of eyes of the seamless capsule SC, uneven thickness thereof, or variation in the particle diameter thereof due to vibration noise. As a result, product quality can be enhanced and thereby seamless capsules of satisfactory quality can be manufactured stably.

Third Embodiment

FIG. 3 is an explanatory view showing a configuration of a vibration absorbing block (vibration absorbing means) 36 used in a seamless capsule manufacturing apparatus according to a third embodiment of the present invention. FIG. 3 (*a*) shows a state before attachment, and FIG. 3 (*b*) shows a state after attachment. The vibration absorbing block 36 has substantially the same configuration as that of the vibration absorbing block 31. However, unlike the vibration absorbing block 31, the slits 33*a* and 33*b* are not formed in the vibration absorbing block 36. That is, the vibration absorbing block 36 has a configuration in which two tube passage attachment holes 37*a* and 37*b* having no slit are formed in a columnar-shaped main body thereof. A block installation bar 38 is fixed to the vibration absorbing block 36. With this configuration, vibration absorbing block 36 is installed at the apparatus main body or the like. Further, a cable tie 39 is wound around the outer periphery of the vibration absorbing block 36.

The vibration absorbing block 36 is also attached to the nozzle 7 side portions of the tube passages 6 and 9 relative to the pumps 5 and 8. With this configuration, like the above-mentioned, the vibration generated by the pumps 5 and 8 is absorbed by the vibration absorbing block 36, making it possible to suppress occurrence of eyes of the seamless capsule SC, uneven thickness thereof, or variation in the particle diameter thereof due to vibration noise. A configuration may be adopted in which the diameters of the tube passage attachment holes 37*a* and 37*b* may be made smaller than those of the tube passages 6 and 9 for press insertion of the tube passages 6 and 9 into the vibration absorbing block 36. In this case, the cable tie 39 can be omitted, depending on the material of the vibration absorbing block 36.

Fourth Embodiment

FIG. 4 is a perspective view showing a configuration of a vibration absorbing unit (vibration absorbing means) 41 used in a seamless capsule manufacturing apparatus according to a fourth embodiment of the present invention, and FIG. 5 is an exploded perspective view thereof. As shown in FIG. 4, the vibration absorbing unit 41 has pads 42*a* and 42*b* arranged so as to face each other. The passage tubes 6 and 9 are held between the pads 42*a* and 42*b*. A block installation bar 43 is also fixed to the vibration absorbing unit 41. As in the case of the above-mentioned embodiments, the vibration absorbing unit 41 is attached to the nozzle 7 side portions (portions corresponding to 6*a* and 9*a* of FIG. 1) of the tube passages 6 and 9 relative to the pumps 5 and 8.

The pads 42*a* and 42*b* are elastic members made of synthetic resin, such as rubber, urethane, or sponge. The facing surfaces of the pads 42*a* and 42*b* each have a wave profile so as to allow the tube passages 6 and 9 to be easily held/fixed therebetween. As shown in FIG. 6, each of the pads 42*a* and 42*b* is fitted to a pad holder 44 (44*a* and 44*b*) made of metal or synthetic resin. The pad holder 44 is formed into a C-shape in cross-section and has the pads are slide-inserted into a holder fitting grooves 45 formed at the upper and lower portions of the pad holder 44.

Fixing bolts 46 are fixed to the pad holder 44*b*. Bolt holes 47 and 48 are formed in the pad holder 44*a* and pad 42*a* at the portions corresponding to the fixing bolts 46. The pad holders 44*a* and 44*b* are fixed in a state in which the tube passages 6 and 9 are held therebetween and, in this state, wing nuts 49 are secured to the fixing bolts 46 that have been inserted through the bolt holes 47 and 48. By fastening the wing nuts 49, the tube passages 6 and 9 are collectively held between the pads 42*a* and 42*b* as shown in FIG. 4.

In such a seamless capsule manufacturing apparatus, the vibration absorbing unit 41 is attached to the tube passages 6 and 9 at the portions between the pump and nozzle, so that the vibration generated by the pumps 5 and 8 is absorbed by the vibration absorbing unit 41. Thus, the vibration generated by the pumps 5 and 8 is not transmitted to the nozzle 7, making it possible to suppress occurrence of eyes of the seamless capsule SC, uneven thickness thereof, or variation in the particle diameter thereof due to vibration noise. As a result, product quality can be enhanced and thereby seamless capsules of satisfactory quality can be manufactured stably. Further, simply by fastening/loosening the wing nuts 49, it is possible to easily open/close the vibration absorbing unit 41, making it easy to attach/detach the tube passages 6 and 9, as well as to adjust a tightening force (tube passage holding force). Further, since the vibration absorbing unit 41 can collectively hold the tube passages 6 and 9 by the simple operation, facilitating the attachment work as compared to the case where a vibration absorbing means is individually attached to each tube passage or where a plurality of tube passages are inserted through the vibration absorbing means.

FIGS. 7 and 8 are explanatory views showing modifications of the fixing configuration of the pad holders. In the modification shown in FIG. 7, pad holders 51a and 51b are hinged by a hinge 52 so as to be freely opened and closed. An engagement pawl 53 projects from the end portion of the pad holder 51a. Correspondingly, an engagement groove 54 is recessed in the end portion of the pad holder 51b. When the tube passages 6 and 9 are held between the pad holders 51a and 51b, the pad holder 51a is rotated in the upper direction to close the pad holders 51a and 52b. Then, the engagement pawl 53 is engaged with the engagement groove 54, so that the pad holders 51a and 51b are fixed in a close state.

Similarly, in a modification shown in FIG. 8, the pad holders 55a and 55b are hinged by a hinge 56 so as to be freely opened and closed. An engagement piece (catch) 57 projects from the end portion of the pad holder 55a. Correspondingly, a fixing hand 58 is provided in the end portion of the pad holder 55b. The fixing hand 58 is a toggle clamp type. When the tube passages 6 and 9 are held between the pad holders 55a and 55b, the pad holder 55a is rotated in the upper direction to close the pad holders 55a and 55b. Then, in a state in which the clamp is loosened, the engagement piece 57 is hooked to the fixing hand 58 followed by fastening of the clamp, thereby the pad holders 55a and 55b are fixed in a close state.

The present invention is not limited to the above embodiments but may be modified in various ways without departing from the scope of the invention.

For example, although all of the nozzle 7 side parts of the tube passages 6 and 9 relative to the pumps 5 and 8 are formed as the flexible sections 16 in the first embodiment, an experiment made by the present inventors reveals that if at least 50% or more of the nozzle 7 side parts of the tube passages 6 and 9 relative to the pumps 5 and 8 are ensured for the flexible sections 16, the flexible sections 16 can sufficiently function as a vibration absorbing means. Further, although the two tube passages 6 and 9 are inserted through one vibration absorbing block 31 (or 36) in the second and third embodiments, the vibration absorbing block may be prepared for each tube passage. Further, the shape of the vibration absorbing block 31 (or 36) is not limited to the columnar shape but blocks of various shapes, such as a rectangular solid block, a block having a polygonal (hexagonal, octagonal, or the like) cross-section may be adopted.

Further, although the two tube passages for core liquid and film forming liquid are provided between the pumps and nozzle in the above embodiments, a double tube in which the core liquid is flowed in the inner tube and film forming liquid is flowed in the outer tube may be used. Further, in the case where the seamless capsule has a three or more-layer structure, three or more tube passages may correspondingly be provided.

The invention claimed is:

1. A seamless capsule manufacturing apparatus for manufacturing a seamless capsule by ejecting a droplet into hardening liquid to harden at least the surface area of the droplet, said apparatus comprising:
   a nozzle;
   a liquid tank for storing liquid to form the droplet;
   a tube passage connecting said liquid tank and said nozzle;
   a pump connected to said tube passage for feeding the liquid to be stored in said liquid tank to said nozzle;
   a vibration unit for applying vibration to said nozzle; and
   a flexible tube section formed of a synthetic resin tube, said flexible tube section being arranged between said pump and said nozzle, and said flexible tube section being configured to absorb vibration noise generated by said pump and to block transmission of the vibration noise from said pump to said nozzle;
   wherein said nozzle, said vibration unit, and said flexible tube section are configured and arranged such that the liquid ejected from said nozzle is cut by the vibration applied to said nozzle by said vibration unit to form the droplet without interference from the vibration noise absorbed and blocked by said flexible tube section.

2. The seamless capsule manufacturing apparatus of claim 1, wherein said flexible tube section comprises at least 50% of an entire length of a passage between said liquid tank and said nozzle.

3. A seamless capsule manufacturing apparatus for manufacturing a seamless capsule by ejecting a droplet into hardening liquid to harden at least the surface area of the droplet, said apparatus comprising:
   a nozzle;
   a liquid tank for storing liquid to form the droplet;
   a tube passage connecting said liquid tank and said nozzle;
   a pump connected to said tube passage for feeding the liquid to be stored in said liquid tank to said nozzle;
   a vibration unit for applying vibration to said nozzle; and
   a vibration absorbing block formed of an elastic member and attached to said tube passage between said pump and said nozzle, said vibration absorbing block having a tube passage attachment hole through which said tube passage passes, and said vibration absorbing block being configured to absorb vibration noise generated by said pump and to block transmission of the vibration noise from said pump to said nozzle;
   wherein said nozzle, said vibration unit, and said vibration absorbing block are configured and arranged such that the liquid ejected from said nozzle is cut by the vibration applied to said nozzle by said vibration unit to form the droplet without interference from the vibration noise absorbed and blocked by said vibration absorbing block.

4. The seamless capsule manufacturing apparatus of claim 3, wherein said vibration absorbing block has a fastening member on an outer periphery thereof for closing said vibration absorbing block around said tube passage passing through said vibration absorbing block.

5. The seamless capsule manufacturing apparatus of claim 4, wherein said tube passage attachment hole has a slit along a longitudinal direction thereof such that said tube passage is inserted into said tube passage attachment hole via said slit, said fastening member being wound around the outer periphery of said vibration absorbing block to close said slit.

6. The seamless capsule manufacturing apparatus of claim 3, further comprising a block installation bar fixed to a substantially longitudinal center portion of said vibration absorbing block for attaching said vibration absorbing block to a stable location.

7. The seamless capsule manufacturing apparatus of claim 3, wherein a diameter of said tube passage attachment hole is smaller than a diameter of said tube passage for allowing an interference fit of said tube passage through said vibration absorbing block.

8. The seamless capsule manufacturing apparatus of claim 3, wherein said vibration absorbing block has a plurality of tube passage attachment holes.

9. A seamless capsule manufacturing apparatus for manufacturing a seamless capsule by ejecting a droplet into hardening liquid to harden at least the surface area of the droplet, said apparatus comprising:
   a nozzle;
   a liquid tank for storing liquid to form the droplet;
   a tube passage connecting said liquid tank and said nozzle;
   a pump connected to said tube passage for feeding the liquid to be stored in said liquid tank to said nozzle;
   a vibration unit for applying vibration to said nozzle; and
   a vibration absorbing unit attached to said tube passage between said pump and said nozzle, said vibration absorbing unit including pad members formed of an elastic member, said pad members being arranged to face each other and hold said tube passage therebetween to absorb vibration noise generated by said pump and to block transmission of the vibration noise from said pump to said nozzle;
   wherein said nozzle, said vibration unit, and said vibration absorbing unit are configured and arranged such that the liquid ejected from said nozzle is cut by the vibration applied to said nozzle by said vibration unit to form the droplet without interference from the vibration noise absorbed and blocked by said vibration absorbing unit.

10. The seamless capsule manufacturing apparatus of claim 9, wherein each of said pad members has a facing surface having a wave profile.

11. The seamless capsule manufacturing apparatus of claim 9, wherein said vibration absorbing unit further includes holder members, each of said pad members being retained by a respective one of said holder members.

12. The seamless capsule manufacturing apparatus of claim 11, wherein each of said holder members has a C-shape cross-section and has holder fitting grooves formed at an upper and a lower portion thereof, said pad members being slid into and retained by said holder fitting grooves.

13. The seamless capsule manufacturing apparatus of claim 11, wherein a first one of said holder members has a fixing bolt, a second one of said holder members having a bolt hole at a position corresponding to said fixing bolt, said vibration absorbing unit further including a nut secured to said fixing bolt after said fixing bolt has been inserted through said bolt hole such that said tube passage is held between said pad members.

14. The seamless capsule manufacturing apparatus of claim 11, wherein said holder members are hinged together by a hinge so as to be freely opened and closed.

* * * * *